United States Patent [19]

Geary et al.

[11] Patent Number: 4,601,684
[45] Date of Patent: Jul. 22, 1986

[54] V-BELT DRIVE SYSTEM FOR CORROSIVE ATMOSPHERES

[75] Inventors: David F. Geary, Severna Park; Edward N. Schinner, Highland; George R. Shriver, Sykesville, all of Md.

[73] Assignee: Baltimore Aircoil Company, Inc., Jessup, Md.

[21] Appl. No.: 586,920

[22] Filed: Mar. 7, 1984

[51] Int. Cl.⁴ ............................................. B62J 13/00
[52] U.S. Cl. ................................. 474/144; 474/148; 74/DIG. 10; 74/606 A
[58] Field of Search ............... 474/144, 273, 161, 190, 474/148, 166, 93, 114; 74/DIG. 10, 606 A

[56] References Cited

U.S. PATENT DOCUMENTS

| | | | |
|---|---|---|---|
| 438,644 | 10/1890 | Robertson | 160/174 |
| 2,205,975 | 6/1940 | Heyer | 474/29 |
| 2,315,317 | 3/1943 | Copp et al. | 474/93 |
| 2,647,409 | 8/1953 | Keim | 474/101 |
| 3,190,543 | 6/1965 | Goettl | 474/93 X |
| 3,229,424 | 1/1966 | Fairchok | 51/148 |
| 3,481,214 | 12/1969 | Warren | 474/70 |
| 3,599,502 | 8/1971 | Craft et al. | 474/114 |
| 3,702,741 | 11/1972 | Goettl | 474/93 X |
| 3,789,684 | 2/1974 | Freier, Jr. | 474/7 |

Primary Examiner—James A. Leppink
Assistant Examiner—Frank Mc Kenzie
Attorney, Agent, or Firm—Charles E. Bouton; Edward J. Brosius

[57] ABSTRACT

A belt-drive assembly for use on air-moving systems in corrosive atmospheres comprising a larger non-metallic driven sheave in conjunction with a smaller metallic driver sheave wherein the metallic sheave may be located in a vented enclosure is disclosed. This arrangement prevents corrosion of the drive system and prolongs belt life.

7 Claims, 1 Drawing Figure

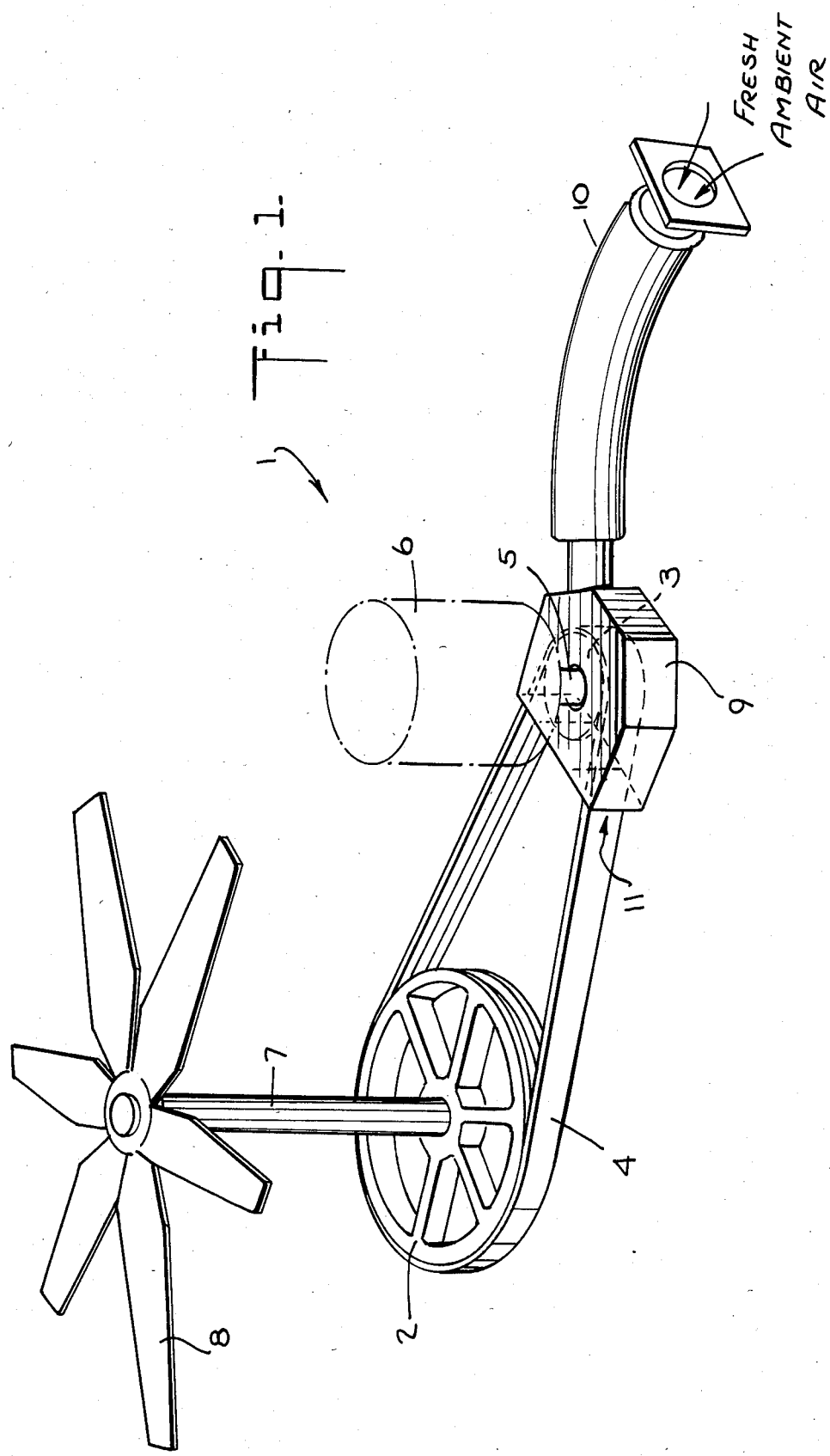

V-BELT DRIVE SYSTEM FOR CORROSIVE ATMOSPHERES

BACKGROUND OF THE INVENTION

V-belt drive systems wherein both the driver sheave (motor pulley) and the driven sheave (fan pulley) were made of metallic material and whereby said V-belt drive system was used in a corrosive atmosphere have been known previously.

This atmosphere is commonly encountered in cooling towers or other type evaporative water-to-air heat exchangers where the fan and drive mechanism is located directly in the outgoing moist air stream. In fact, in this type of cooling tower atmosphere where the drive system would be located, the air is mildly heated and highly humidified by the cooling tower recirculating water. Additionally the cooling tower air usually accumulates and circulates drift (water carryover) particles which can contain chemical additives and salt concentrations and are usually highly corrosive to lower-cost metals. Also, when used in a cooling tower atmosphere during fan off-cycles, this region is encompassed in a fog-like mist of corrosive vapors which emanate from the cooling tower chambers.

The problem of preventing corrosion of this type V-belt drive system was solved in the past by totally encasing the entire drive system in a vented enclosure. In this case, both driver and driven sheaves were made of cast iron or steel. The disadvantages of this system were that one could not see the V-belt or drive belt and that large and cumbersome components which were part of the vent enclosure had to be removed when inspecting or changing the belts. In addition air flow can be restricted by the vented enclosure which normally is directly beneath the fan.

Applicants' invention relates to the use of a V-belt drive system using a non-metallic driven sheave and a metallic driver sheave wherein the non-metallic driven sheave is larger than the metallic driver sheave and the metallic driver sheave may be enclosed in a vented chamber which is ventilated with fresh ambient air by action of the fan system served by said V-belt drive system.

SUMMARY OF DETAILED DESCRIPTION OF THE INVENTION

The most corrosive condition occurs when metallic sheaves are repetitiously exposed to high humidities and reduced temperatures where water does not readily evaporate, or where the atmosphere is filled with carryover water droplets which may contain corrosive chemical elements, such as is encountered in cooling towers. In this application the larger driven sheave is normally mounted on the fan shaft and turns at a lower rotational speed than the smaller driver sheave which is typically mounted on the motor shaft.

In this corrosive environment, the larger diameter metallic driven sheave can corrode heavily and produce corrosive particles in the groove-contact area where the belt rubs as it passes around the larger arc-of-contact of the driven sheave. These corrosive particles, which tend to embed themselves in the V-belt as the belt moves in and out of the grooves of the larger sheave upon entering and leaving the larger sheave, can be transferred to the area of the driving sheave by the belt and, during slippage, cause the rapid abrasive wear of belt surfaces which causes too frequent replacing of V-belts.

Thus, the mechanism of belt wear involved at least two separate actions. First, the corrosive particles which built up in the sheave groove tend to wear the belt surfaces by abrasion as the belt moved radially in and out of the groove, upon entering and leaving the sheave region. Secondly, the corrosion particles which were loose tend to embed in the rubber belts and eventually abraded the belt as it "slipped" at the motor sheave area. The smaller sheave remained relatively free of corrosion in the belt contact area, due to: (a) local slippage with consequent friction-heating of the small sheave surface and (b) rapid evaporation of moisture at the small sheave contact surface.

Thus, according to our invention, we have found that the larger or driven sheave must be made of a non-metallic material. The small or driver sheave, on the other hand, must be of a metallic material to accommodate friction-heating and maximum torque transfer.

It has been found that the smaller metallic driver sheave actually stays relatively free or clean of corrosion in a corrosive atmosphere because said driver sheave is generally attached to the motor shaft and remains at a higher temperature, due both to the direct conductive heating from the warmer motor armature and due to friction heating of the small sheave contact surface, which is caused by the friction heat of normal belt slippage at the motor sheave. Because of the higher temperature, there would be less corrosion and in particular where the system is exposed to a moist or wet atmosphere, the higher temperature would alloy any water contained thereon to evaporate more quickly and thus cause less corrosion.

The small metallic sheave is subject to the same common atmospheric conditions as the large sheave, and being so, might be expected to have a "corrosion-particle-embedding" effect on the belt during start-up operations. However, it is not feasible to make the small driver sheave out of plastic or polymer type materials since the belt usually slips slightly during operation and, if the belt is loose, it slips excessively during start-up. This slippage causes friction heat-up of the smaller motor sheave to a temperature level which is too high for use of normal composite plastics or polymers.

Therefore, it has been found that it is highly desirable to eliminate the primary source of corrosive and abrasive particles from the belt-contact surfaces of the larger diameter polymer sheave in a belt drive system and to ventilate the small metallic sheave with fresh ambient air.

Thus, it is an object of our invention to provide a V-belt drive system for use in a corrosive atmosphere which is composed of non-metallic drive sheave in connection with a smaller metallic driver sheave and whereby the smaller metallic driver sheave may be located in a vented atmosphere to prevent corrosion of the system and excessive belt wear.

It is another object of the invention to prevent corrosion of the V-belt drive system but yet maintain a system whereby the belt can be visually inspected without removing a large venting enclosure.

It is another object of the invention to prevent corrosion of the V-belt drive system without totally encasing the entire drive system in a large vented enclosure which can restrict airflow since it would normally be located directly beneath the fan.

It is still further object of the invention to provide an economic drive system which is less expensive than other drive systems by incorporating a small venting system only around the driver sheave which results in less corrosion of the driver sheave leading to less frequent replacement of the driver sheave or V-belt.

It will be well known to those skilled in the art that this invention cannot only be used in the cooling tower atmosphere which is the embodiment described in the instant application but can also be used in any corrosive type atmosphere which may include sea coast sites and chemical or industrial plants.

To better understand our invention, there is enclosed FIG. 1, which is an isometric view of the entire system.

Referring now to FIG. 1, there is shown the V-belt drive system 1, which comprises a driven sheave 2, a driver sheave 3, and a V-belt 4, connecting said two sheaves. The driver sheave 3 is connected to a shaft 5 which itself is driven by a motor 6. Driven sheave 2 is attached to the shaft 7 which is connected to the fan 8 for our particular installation, said fan being generally part of a crossflow or counterflow induced draft cooling tower.

Provided around the driver sheave 3 is a vented enclosure 9 to which fresh ambient air is lead from a fresh ambient air source (as indicated by the arrows in FIG. 1) through a conduit 10. The fresh air is lead into the interior of the vented enclosure 9 and surrounds the driving sheave. The vented enclosure 9 has open slots 11 so that the V-belt 4 can pass therethrough unhindered, and ambient air can exhaust therefrom.

Although no supporting structures are shown for the driver and driven sheaves 2 and 3 and their shafts 5 and 7, respectfully, it would be understood by those skilled in the art that framing and supporting mechanisms (which themselves are well known in the art) would have to support this entire system.

The larger or driven sheave 2, as stated, can be made of a non-metallic material, particularly a plastic or polymer material such as, for example, nylon-like thermoplastic or various thermosetting materials. The non-metallic material of which the driven sheave 2 is composed can also contain composite additives.

The small or driver sheave 3 can be composed of any conventional metallic material, such as, for example, cast iron, malleable iron, carbon steel or stainless steel.

In our system, the sheave 2 is larger than the sheave 3 and it has been found that the best ratio or dimensions of the large sheave 2 when compared to the small driver sheave 3 is typically a ratio of the diameter which range from 10:1 to 1½:1 in a single stage V-drive system.

The belt 4 which is typically a V-groove type belt is usually made of a neoprene or rubbery surface material which can have reinforcing fibers of either steel or other woven or plastic material dispersed therein. It also may be a "banded belt" or attached grouping of V-belts for multiple belt system requirements.

It would be known to those skilled in the art that although the V-belt drive system of our invention has been described as a single stage, the system would also work with multiple stage drive systems having sheave overall speed ratios of 10:1 or more.

The description of the V-belt drive system of our invention should be considered as an illustration of this type of system and should not be considered as a limitation thereof.

What is claimed is:

1. An improved V-belt drive apparatus including a driven sheave and a driver sheave connected by a V-belt, all contained within a zone of corrosive atmosphere, said improvement comprising:
   an enclosure within said zone containing only said driver sheave and a portion of the V-belt trained thereabout;
   and venting means connecting said enclosure to an ambient atmosphere outside the zone of corrosive atmosphere whereby said ambient atmosphere may flow directly from outside the zone through said enclosure to pass across said driver sheave and exhaust into said zone of corrosive atmosphere.

2. The apparatus of claim 1 wherein said driven sheave is connected to a fan means that moves said corrosive atmosphere through said zone and also draws said ambient atmosphere through said enclosure.

3. The apparatus of claim 2 wherein said driven sheave is comprised of a non-metallic material and said driver sheave is comprised of a metallic material.

4. The apparatus of claim 3 wherein said driven sheave is 1½ to 10 times the diameter of said driver sheave.

5. The apparatus of claim 1 where said driven sheave is comprised of a non-metallic material and said driver sheave is comprised of a metallic material.

6. The apparatus of claim 1 wherein said enclosure has open slots for said V-belt and said venting means includes a conduit connected to said enclosure generally opposite said slots.

7. The apparatus of claim 6 wherein said driver sheave is connected to a motor, said motor being located outside said enclosure.

* * * * *